(12) United States Patent
Albrecht

(10) Patent No.: US 6,713,721 B2
(45) Date of Patent: Mar. 30, 2004

(54) METHOD OF DESIGNING AND MANUFACTURING WELDING-TYPE POWER SUPPLIES

(75) Inventor: Bruce P. Albrecht, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 6 days.

(21) Appl. No.: 09/956,401

(22) Filed: Sep. 19, 2001

(65) Prior Publication Data

US 2003/0052106 A1 Mar. 20, 2003

(51) Int. Cl.$^7$ ................................................ B23K 9/10
(52) U.S. Cl. ............................. 219/137 PS; 219/130.1
(58) Field of Search ..................... 219/137 PS, 130.21, 219/130.31, 130.32, 130.33, 130.5, 130.51, 130.1; 363/26, 89

(56) References Cited

U.S. PATENT DOCUMENTS

| | | | | |
|---|---|---|---|---|
| 4,425,613 A | * | 1/1984 | Shelly | 363/26 |
| 4,447,695 A | | 5/1984 | Inoue | |
| 4,503,316 A | | 3/1985 | Murase et al. | |
| 4,564,742 A | * | 1/1986 | Karlsson | 219/137 PS |
| 5,991,169 A | | 11/1999 | Kooken | |
| 6,091,049 A | * | 7/2000 | Ikeda et al. | 219/130.21 |
| 6,115,273 A | | 9/2000 | Geissler | |
| 6,177,645 B1 | * | 1/2001 | Church et al. | 363/89 |
| 6,291,798 B1 | * | 9/2001 | Stava | 219/130.32 |

FOREIGN PATENT DOCUMENTS

EP 1086773 A2 3/2001

OTHER PUBLICATIONS

ALT 304 Miller® The Power of Blue Oct. 2000.
Maxstar® SD, DX, And LX Miller® The Power of Blue Dec. 2000.

* cited by examiner

Primary Examiner—Clifford C. Shaw
(74) Attorney, Agent, or Firm—George R. Corrigan

(57) ABSTRACT

A method of manufacturing a plurality of welding-type systems, and the systems, are disclosed. The power supplies are each suitable for at least one of a plurality of processes, and have "N" (an integer) power modules in parallel. Each power module produces a module output power, and has a maximum output power of at least $P_{pm}$. Each power module has a similar preregulator that receives any input voltage over a range of input voltages and/or power factor corrects the input, and they include a converter circuit connected to the preregulator. The number N is determined by determining a desired maximum system power $P_{d1}$ for a first particular system, and by dividing $P_{pm}$ into $P_{d1}$. There can be two types of power modules, with different output power. The output circuit may include an inverter that inverts dc power, and/or a switched snubber. The preregulator may includes an SVT and/or an SCT circuit. A single user interface may be operatively connected to the power modules, and the output may be ac, dc, cc, and/or cv.

29 Claims, 2 Drawing Sheets

US 6,713,721 B2

METHOD OF DESIGNING AND MANUFACTURING WELDING-TYPE POWER SUPPLIES

FIELD OF THE INVENTION

The present invention relates generally to the art of designing and manufacturing welding-type system. More specifically, it relates to designing and manufacturing different welding-type systems used in a variety of processes and having a variety of outputs.

BACKGROUND OF THE INVENTION

Welding-type power supplies or systems are made for a variety of processes, such as stick, TIG, MIG, pulse, sub-arc, heating, cutting, and the maximum output power or current can be anywhere from one hundred or less amps, to five hundred or more. The maximum output of a particular welding-type system is chosen for the process and/or commercial market for which it is intended.

In the prior art, a welding power supply has been designed for a particular output, and the power circuitry, controller, output circuitry, etc., are designed with the maximum output power in mind. Thus, a 100 amp system might be considerable different from a 200 amp machine, which is different from a 300 amp machine and so forth.

Unfortunately, designing a system from the ground up requires extensive engineering for each system. Sometimes, in an effort to reduce the attending engineering costs, a power supply is scaled up for a higher output by increasing switch capacities, or placing switches in parallel. However, there are limits to this sort of scaling up, and it gets ever more costly for components to tolerate ever greater currents.

Occasionally, a system has had its output increased by placing two power supplies in parallel. While this allows easier design of a system, it is limited in its applications to systems having twice the maximum output of the base system. Also, the input circuits were limited to a particular type of input and the two-supply machine was capable of working off one particular utility source. Thus, the use of the two supplies to design a system was of rather limited application.

Accordingly, a method of designing power supplies that allows the use of commonly engineered circuitry that can produce maximum output power of a wide range is desired. Also, the method will preferably be used to design systems for a variety of type of input and output power and used in a variety of processes.

SUMMARY OF THE PRESENT INVENTION

According to a first aspect of the invention, a method of manufacturing a plurality of welding-type systems that are each suitable for at least one of a plurality of processes includes connecting a number "N" power modules in parallel. Each power module produces a module output power, and has a maximum output power of at least $P_{pm}$. Each power module has a common preregulator that receives any input voltage over a range of input voltages and/or power factor corrects the input, and they include a converter circuit connected to the preregulator. The number N is determined by determining a desired maximum system power $P_{d1}$ for a first particular system, and by dividing $P_{pm}$ into $P_{d1}$.

According to a second aspect of the invention a welding-type system suitable for at least one process having a desired maximum system power of $P_d$, includes N power modules connected in parallel. The parallel connection has an input and an output. N is an integer equal to $P_d/P_{pm}$ rounded up, and $P_{pm}$ is an output power of each power module. Each module has a preregulator capable of receiving any input voltage over a range of input voltages. A system output is connected to the output.

According to one embodiment a second power module produces output power of at least $P_{pm}$ and includes the common preregulator. It also includes a second converter circuit connected to the preregulator. A desired maximum system power $P_{d2}$ for a second particular system is determined, and $P_{pm}$ is divided into it to obtain a number $N_2$. $N_2$ second power modules are connected in parallel.

According to other embodiments the output circuit includes an inverter that inverts dc power, and/or a switched snubber.

The preregulator that includes an SVT and/or an SCT circuit in another embodiment.

A single user interface is operatively connected to the N power modules in yet another embodiment.

The output circuit converts the output to an ac, dc, cc, and/or cv welding-type output in various embodiments.

According to a third aspect of the invention a method of designing a plurality of welding-type systems includes designing a common power circuit capable of receiving an input and producing a maximum output dc power of at least $P_{pm}$. Also, it includes determining a desired maximum system power $P_d$ for each of the plurality of systems. The number of power modules that will collectively produce the output power $P_d$ for each of the plurality of systems is determined. The type of output power desired for each particular system is determined and at least one output circuit that converts the output to the type of power desired is designed.

Yet another aspect of the invention is a welding-type system suitable for at least one process having a desired maximum system power of $P_d$, that includes N power modules connected in parallel. N is an integer equal to $P_d/P_{pm}$ rounded up to the nearest integer, where $P_{pm}$ is an output power of each power module. Each power module has a preregulator having an SCT and SVT circuit.

According to one alternative the power module is designed to receive any input voltage over a range of input voltages.

According to another aspect of the invention a welding-type system suitable for at least one process has a desired maximum system power of $P_d$. The system includes N first power modules connected in parallel with M second power modules. The parallel connection has an input and an output, and the total power output is greater than $P_d$. Each first and second power module has a preregulator capable of receiving any input voltage over a range of input voltages.

Other principal features and advantages of the invention will become apparent to those skilled in the art upon review of the following drawings, the detailed description and the appended claims.

Figure 1:
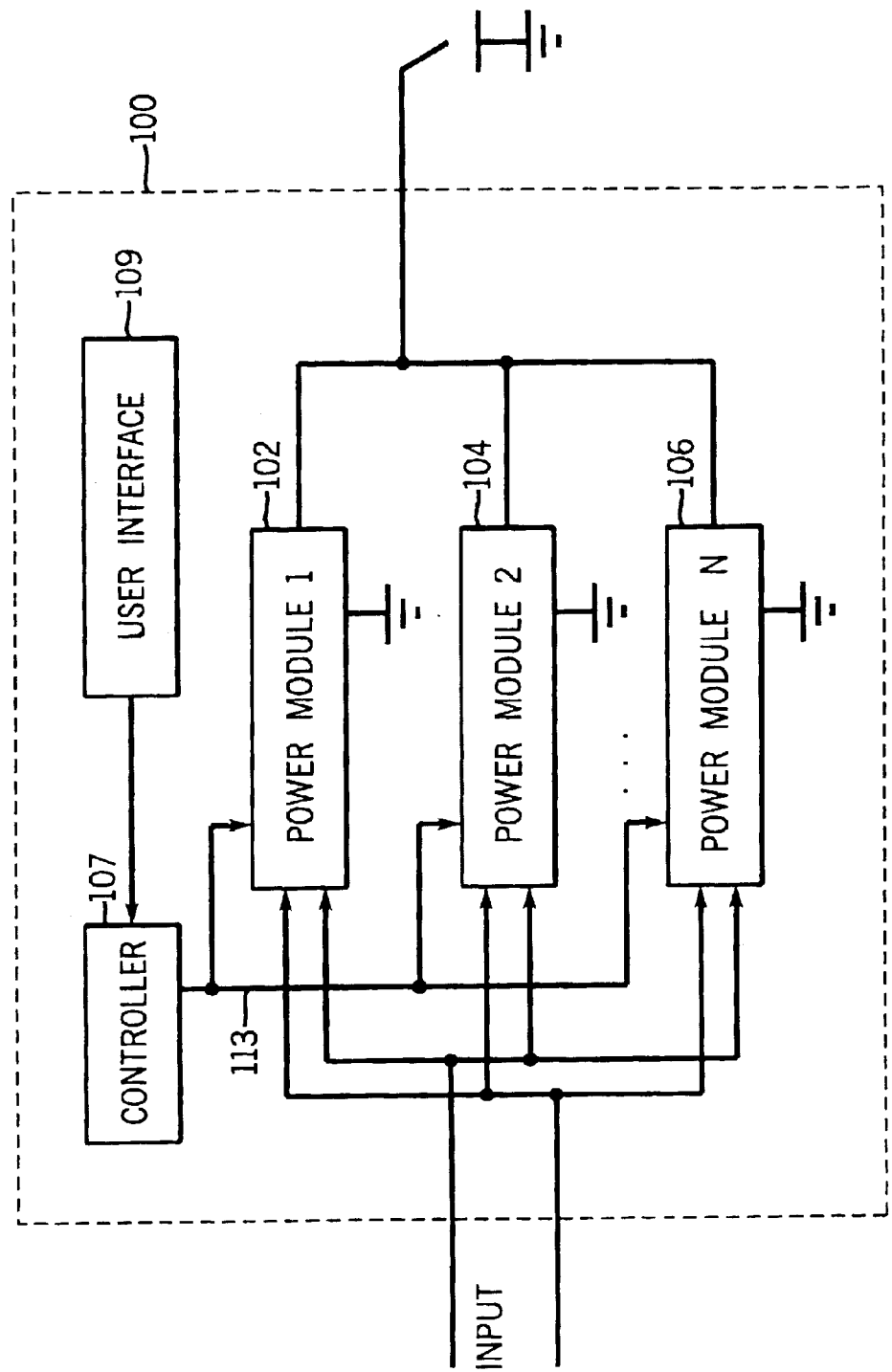
FIG. 1 is a diagram of a welding-type system constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular welding-type systems it should be understood at the outset that the invention can also be implemented with other systems, power circuits, controllers, etc.

Generally, the invention provides for designing welding-type power supplies or welding-type systems in an economical and efficient manner by using power modules with common features, such as a common preregulator.

Welding-type system, as used herein, includes systems for welding, cutting or heating. A number of power modules are placed in parallel such that their combined or collective output is at least as great as the desired maximum system power.

Preferably, each power module includes a preregulator that produces bus power and an output circuit that converts, transforms, rectifies, or passes through the bus power to the system output (and thus should be selected for the processes for which the system will be used).

The preregulator is preferably common from system to system, even for systems used in different processes. The preregulator preferably can receive any voltage or frequency input and provide a dc bus of predetermined voltage. Thus, any input may be used. Preferably, the preregulator power factor corrects the input.

Within a single system or systems used for like processes the output circuit may be common. But the output circuit may be different for different systems used in different processes. Thus, output power of any type may be obtained by proper selection of the output circuit. The output of the power modules is combined in a single system output. Additionally, a single user interface is provided that allows the user to select output and process parameters.

The manner of control between and within power modules can be performed in any number of manners. The preferred embodiment provides that each module, through a process controller, receive a set point from the user interface. The control command (which causes an increase or decrease in power) is set by comparing the actual output to the desired output. In an alternative, one module is the master and the remaining modules are slaved to the master, and provide a concomitant increase or decrease in power. Another embodiment provides multiple master modules.

Common power module, as used herein, includes power modules having similar circuitry that responds to similar control commands, and one or more of the modules may be a master module that controls the remaining modules, or each module may respond to an external control independent of the other modules. Desired maximum system power, or maximum output power, as used herein, is the maximum power or current for which a welding system is designed or intended to produce.

The preregulator in each each power module, in the preferred embodiment, includes an input rectifier, power circuitry, control circuitry and provides a dc output to a common bus. Preregulator as used herein, includes circuitry such as rectifiers, switches, transformers, SCRs, etc that process input power and/or software, control circuitry feedback circuitry, communication circuitry, and other ancillary circuitry associated therewith. Common preregulator, as used herein, includes preregulators having similar circuitry being used in two or more power modules, wherein each module has a preregulator, but the preregulators are similar to one another.

The specific circuitry can be of any design, but in the preferred embodiment is of the type found in the Miller Alt304® or Miller MaxStar® welding systems, also described in U.S. patent application Ser. No. 09/540,567, filed Mar. 31, 2000, entitled Method And Apparatus For Receiving A Universal Input Voltage In A Welding, Plasma Or Heating Power Source. An alternative is described in U.S. Pat. No. 6,115,273, entitled Power Converter With Low Loss Switching, issued Sep. 5, 2000, which is hereby incorporated by reference.

This type of preferred preregulator includes input circuitry that allows the system to receive virtually any input voltage, and preferably any input frequency, over a range of voltages, and convert that power to a desired dc bus voltage. Also, it includes SCT and SCT circuitry, as shown in U.S. Pat. No. 6,115,273. SCT circuit, as used herein, includes power switches having transitions where the current rise is slowed (rather than held to zero), while the switch turns off or on. SVT circuit, as used herein, includes power switches having transitions where the voltage rise is slowed (rather than held to zero), while the switch turns off or on.

The output circuit, in the preferred embodiment, receives the dc bus voltage, and inverts, converts, transforms, rectifies or passes through power to the output of the system. Preferably, the output circuit includes an inverter and/or a switched snubber, such as that shown in U.S. Pat. No. 6,115,273.

Output circuit, as used herein, includes a circuit configured to receive power and transform, convert or pass that power having characteristics (such as cc, cv, ac, dc, pulse width, pulse shape) suitable for one or more welding, cutting and/or heating processes. The output circuit thus provides a welding-type output. Welding-type output, as used herein, includes outputs suitable for welding, plasma or heating. Processes, as used herein, is a welding, cutting or heating application typically performed using a type of power over a range of power or current magnitudes.

Referring now to FIG. 1, a welding-type system 100 in accordance with the present invention is shown. System 100 includes an input 101, a plurality of power modules 102–106, a process controller 107, a user interface 109 and a system output 108.

Input 101 may be any frequency ac (50 or 60 Hz e.g.) or dc, provided by utility or generator, and operating at any voltage over a range of voltages (such as from 100V to 560V), single or multi-phase. Each power module receives the input power and provides an output power to system output 108. Also, each power module has a maximum power output (10 KW in the preferred embodiment).

The design of system 100 entails determining the number of power modules needed by determining the maximum system power output for a particular system, and dividing the needed power by the power from each module. The number of modules is the result after rounding off or up.

For example, if power modules 102–106 provide 10 KW of power each, and the system is to have at least 55 KW of output power, then 3 modules are used. If the system is to have 80 KW of output power then 4 modules are used. Alternatively, current may be used: if each modules produces 250 amps at 40V, then for a system to produce 750 amps at 40 volts, 3 modules are used. So long as the output voltage of each module and the output voltage of the system remain the same, current and power may be used interchangeably in determining the number of modules.

One alternative provides for modules of different power. For example, 100 amp and 150 amp modules could be used. They could be combined to make power supplies with 110, 150, 200, 250, 300, 350 . . . amp outputs. The desired output would be N1*P1+N2*P2, where N1 is the number of modules having power P1 and N2 is the number of modules having power P2.

User setpoints are provided from a user interface 109 (which may be part of system 100) on an input 113 to module 103. A controller 107 provides setpoint information to each module. The setpoint information may be a scaled error signal, based on the difference between the system output and the user setpoint, or it may be a scaled user setpoint.

Figure 2:
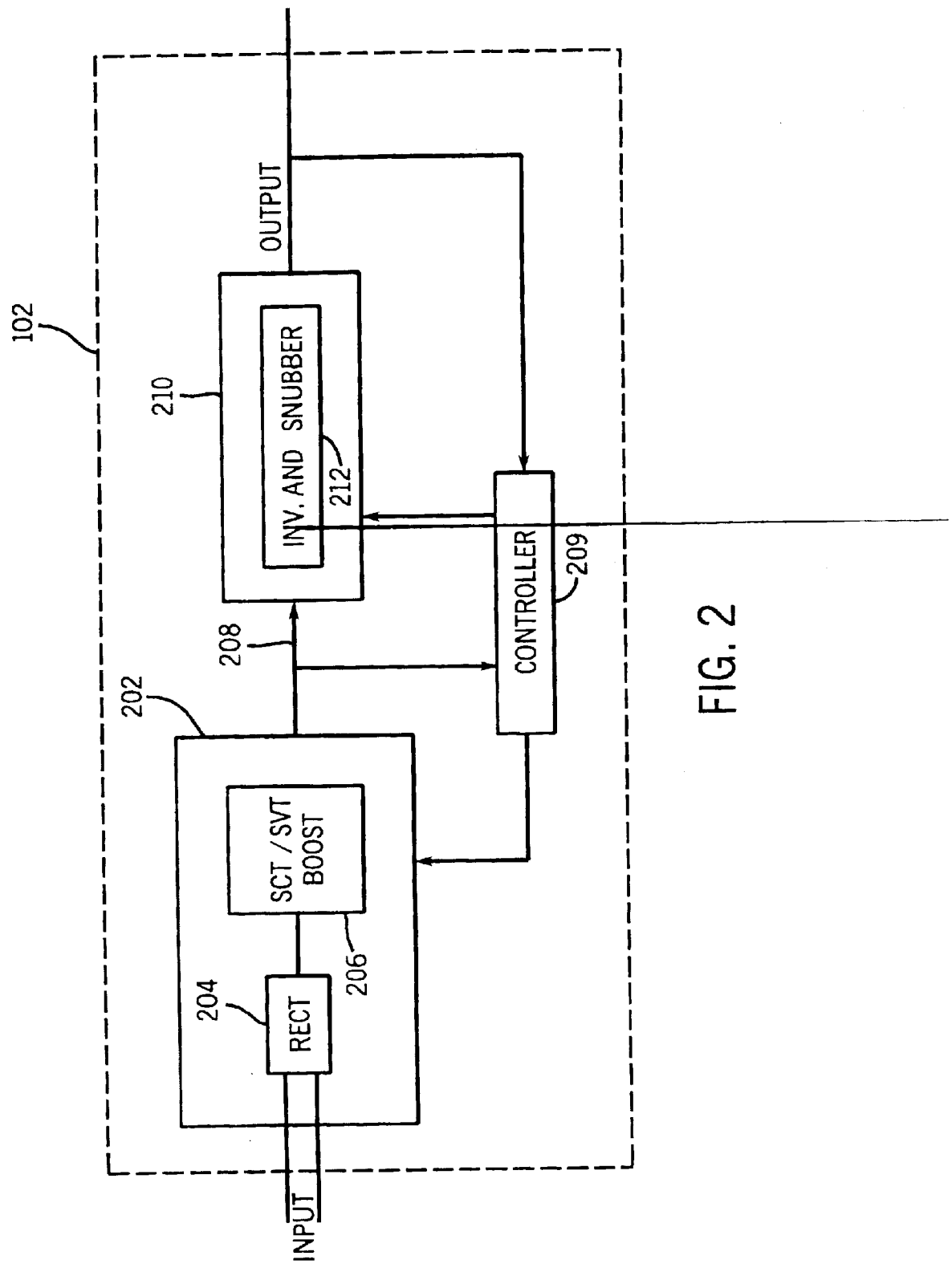
FIG. 2 is a diagram of a power module used in the system of FIG. 1.

Power module 102 is shown in more detail in FIG. 2 and includes a preregulator 202. a controller 209, and an output circuit 210. Preregulator 202 includes a rectifier 204 which rectifies the input voltage (if the input is ac) and provides the rectified voltage to a boost circuit 206, which includes an SCT and SVT switched switch. Such a preregulator may be found in the above-mentioned prior art. Preregulator 202 produces a dc output to a bus 208 (900V in the preferred embodiment). The 900 V is produced regardless of the input provided to preregulator 202.

Controller 209 receives feedback and/or reference signals and provides switching signals to preregulator 202 and output circuit 210.

Output circuit 210 receives 900V bus 208 and provides welding-type output power. Output circuit 210 includes an inverter and a switched snubber circuit, as found in the prior art, and may include a transformer to step down the voltage to a desired level.

Other types of preregulator and output circuitry may be used, including inverters, converters, phase control, etc. in various embodiments.

Numerous modifications may be made to the present invention which still fall within the intended scope hereof. Thus, it should be apparent that there has been provided in accordance with the present invention a method and apparatus for designing welding-type systems that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of manufacturing a plurality of welding-type systems suitable for at least one of a plurality of processes, comprising:
   providing a power module that produces a module output power, and having a maximum module output power of at least $P_{pm}$, wherein the power module includes a common boost preregulator capable of receiving any input voltage over a range of input voltages, and the power module further includes a converter circuit connected to the preregulator;
   determining a desired maximum system power $P_{d1}$ for a first particular system; and
   connecting N power modules in parallel such that the parallel connection has an input and an output, wherein N is the integer equal to $P_{d1}/P_{pm}$ rounded up to the nearest integer, wherein the output is a system output, thereby making a first welding-type system.

2. The method of claim 1, further comprising:
   providing a second power module that produces the module output power, and having the maximum module output power of at least $P_{pm}$, wherein the second power module includes the common preregulator, and the second power module further includes a second converter circuit connected to the preregulator; and
   determining a desired maximum system power $P_{d2}$ for a second particular system;
   connecting $N_2$ second power modules in parallel such that the parallel connection has a second input and a second output, wherein $N_2$ is the integer equal to $P_{d2}/P_{pm}$ rounded up to the nearest integer, wherein the output is a system output, thereby making a second welding-type system.

3. The method of claim 2, wherein providing the power module further comprises providing the output circuit with an inverter that inverts dc power.

4. The method of claim 3, wherein providing the power module further comprises providing the output circuit with a switched snubber.

5. The method of claim 3, wherein providing a common power module further comprises providing a preregulator that includes an SVT and SCT circuit.

6. The method of claim 1, further comprising providing a single user interface operatively connected to the N power modules.

7. The method of claim 1, wherein providing the power module further comprises providing the output circuit to convert the output to an ac welding-type output.

8. The method of claim 1, wherein providing the power module further comprises providing the output circuit converts the output to a welding-type output.

9. A welding-type system suitable for at least one process having a desired maximum system power of $P_d$, comprising:
   N power modules connected in parallel such that the parallel connection has an input and an output, wherein N is an integer equal to $P_d/P_{pm}$ rounded up to the nearest integer, and $P_{pm}$ is an output power of each power module, and wherein each power module has a boost preregulator capable of receiving any input voltage over a range of input voltages; and
   a system output connected to the output.

10. The system of claim 9, wherein each power module includes an output circuit having an inverter with an input connected to a preregulator and an output connected to the system output.

11. The system of claim 10, wherein each output circuit includes a switched snubber connected to the system output.

12. The system of claim 9, wherein each common power module include an SVT and SCT circuit.

13. The system of claim 9, further comprising a user interface operatively connected to the N power modules.

14. A welding-type system suitable for at least one process having a desired maximum output power $P_d$, comprising:
   N means for producing at least $p_m$ power from any input voltage over a range of input voltages, the means including a boost preregulator and further being connected in an additive arrangement and having a common dc output, wherein N is an integer equal to $P_d/P_m$ rounded up to the nearest integer; and N output means for converting the dc output to a desired type of output power.

15. The system of claim 14, wherein the output means includes means for inverting.

16. The system of claim 14, further comprising means for interfacing with a user, operatively connected to the N power modules.

17. A method of manufacturing a plurality of welding-type system suitable for at least one of a plurality of processes, comprising:

providing a power module that produces a module output power, and having a maximum module output power of at least $P_{pm}$, wherein the power module includes a common boost preregulator and a converter circuit connected to the preregulator;

determining a desired maximum system power $P_{d1}$ for a first particular system;

connecting N power modules in parallel such that the parallel connection has an input and an output, wherein N is the integer equal to $P_{d1}/P_{pm}$ rounded up to the nearest integer, wherein the output is a system output, thereby making a first welding-type system;

providing a second power module that produces the module output power, and has the maximum module output power of at least $P_{pm}$, wherein the second power module includes the common preregulator, and the second power module further includes a second converter circuit connected to the preregulator;

determining a desired maximum system power $P_{d2}$ for a second particular system; and connecting $N_2$ second power modules in parallel such that the parallel connection has a second input and a second output, wherein $N_2$ is the integer equal to $P_{d2}/P_{pm}$ rounded up to the nearest integer, wherein the output is a system output, thereby making a second welding-type system.

18. The method of claim 17, wherein providing the power module further comprises providing the output circuit with an inverter that inverts dc power.

19. The method of claim 18, wherein providing the power module further comprises providing the output circuit with a switched snubber.

20. The method of claim 19, wherein providing a common power module further comprises providing a preregulator that includes an SVT and SCT circuit.

21. The method of claim 17, further comprising providing a single user interface operatively connected to the N power modules.

22. A welding-type system suitable for at least one process having a desired maximum system power of $P_d$, comprising:

N power modules connected in parallel such that the parallel connection has an input and an output, wherein N is an integer equal to $P_d/P_{pm}$ rounded up to the nearest integer, and $P_{pm}$ is an output power of each power module, and wherein each power module has a boost preregulator having an SCT and SVT circuit; and a system output connected to the output.

23. The system of claim 22, wherein each power module includes an output circuit having an inverter with an input connected to a preregulator and an output connected to the system output.

24. The system of claim 23, wherein each output circuit includes a switched snubber connected to the system output.

25. The system of claim 22, further comprising a user interface operatively connected to the N power modules.

26. A method of manufacturing a plurality of welding-type systems suitable for at least one of a plurality of processes, comprising:

providing a first power module that produces a first module output power, and having a maximum module output power of at least $P_{pm1}$, wherein the first power module includes a boost preregulator capable of receiving any input voltage over a range of input voltages, and the first power module further includes a first converter circuit connected to the preregulator;

providing a second power module that produces a second module output power, and having a maximum module output power of at least $P_{pm2}$, wherein the second power module includes a second preregulator capable of receiving any input voltage over a range of input voltages, and the second power module further includes a second converter circuit connected to the preregulator;

determining a desired maximum system power $P_{d1}$ for a first particular system; and connecting N first power modules in parallel with M second power modules, such that the parallel connection has an input and an output, wherein the total power output is at least $P_{d1}$.

27. A welding-type system suitable for at least one process having a desired maximum system power of $P_d$, comprising:

N first power modules connected in parallel with M second power modules, such that the parallel connection has an input and an output, wherein the total power output greater than $P_d$, and wherein each first and second power module has a boost preregulator capable of receiving any input voltage over a range of input voltages; and a system output connected to the output.

28. A method of manufacturing a plurality of welding-type systems suitable for at least one of a plurality of processes, comprising:

providing a power module that produces a module output power, and having a maximum module output power of at least $P_{pm}$, wherein the power module includes a common boost preregulator capable of power factor correcting an input, and the power module further includes a convecter circuit connected to the preregulator;

determining a desired maximum system power $P_{d1}$ for a first particular system; and connecting N power modules in parallel such that the parallel connection has an input and an output, wherein N is the integer equal to $P_{d1}/P_{pm}$ rounded up to the nearest integer, wherein the output is a system output, thereby making a first welding-type system.

29. A welding-type system suitable for at least one process having a desired maximum system power of $P_d$, comprising:

N power modules connected in parallel such that the parallel connection has an input and an output, wherein N is an integer equal to $P_d/P_{pm}$ rounded up to the nearest integer, and $P_{pm}$ is an output power of each power module, and wherein each power module has a boost preregulator with a power factor correction module; and a system output connected to the output.

* * * * *